(12) United States Patent
Hoshika et al.

(10) Patent No.: US 11,408,047 B2
(45) Date of Patent: Aug. 9, 2022

(54) ALLOYED HOT-DIP GALVANIZED STEEL SHEET AND ALLOYED HOT-DIP GALVANIZED STEEL SHEET PRODUCTION METHOD

(71) Applicant: Kobe Steel, Ltd., Kobe (JP)

(72) Inventors: Tetsuji Hoshika, Kakogawa (JP); Muneaki Ikeda, Kakogawa (JP); Michiharu Nakaya, Kakogawa (JP)

(73) Assignee: Kobe Steel, Ltd., Kobe (JP)

( * ) Notice: Subject to any disclaimer, the term of this patent is extended or adjusted under 35 U.S.C. 154(b) by 11 days.

(21) Appl. No.: 17/040,348

(22) PCT Filed: Mar. 12, 2019

(86) PCT No.: PCT/JP2019/009880
§ 371 (c)(1),
(2) Date: Sep. 22, 2020

(87) PCT Pub. No.: WO2019/188235
PCT Pub. Date: Oct. 3, 2019

(65) Prior Publication Data
US 2021/0017621 A1    Jan. 21, 2021

(30) Foreign Application Priority Data

Mar. 28, 2018 (JP) .............................. JP2018-062586
Feb. 19, 2019 (JP) .............................. JP2019-027330

(51) Int. Cl.
*C23C 2/02* (2006.01)
*C23C 2/06* (2006.01)
(Continued)

(52) U.S. Cl.
CPC ................ *C21D 9/46* (2013.01); *B32B 15/01* (2013.01); *B32B 15/013* (2013.01); *B32B 15/04* (2013.01);
(Continued)

(58) Field of Classification Search
CPC ........ C21D 2211/002; C21D 2211/005; C21D 2211/008; C21D 8/0205; C21D 8/0221;
(Continued)

(56) References Cited

U.S. PATENT DOCUMENTS

2015/0111064 A1   4/2015   Ikeda et al.
2016/0160335 A1   6/2016   Ikeda
(Continued)

FOREIGN PATENT DOCUMENTS

CN    103757534 A    4/2014
JP    2010-106343 A    5/2010
KR    10-2017-0086098 A    7/2017

OTHER PUBLICATIONS

International Search Report dated May 21, 2019 in PCT/JP2019/009880 filed on Mar. 12, 2019, 2 pages.

*Primary Examiner* — Michael E. La Villa
(74) *Attorney, Agent, or Firm* — Oblon, McClelland, Maier & Neustadt, L.L.P.

(57) ABSTRACT

In one aspect of the present invention, a hot-dip galvannealed steel sheet includes a steel sheet and a hot-dip galvannealed layer on the surface of the steel sheet. The steel sheet has a predetermined composition and has an average oxygen concentration of 0.10 mass % or less in the region of 1 μm from the interface between the steel sheet and the hot-dip galvannealed layer toward the steel sheet. The metal microstructure of the steel sheet at a position of t/4 where t represents the sheet thickness of the hot-dip galvannealed steel sheet includes 50 to 85 area % of martensite, 15 to 50 area % of bainite, and 5 area % or less of ferrite.

2 Claims, 2 Drawing Sheets (51) Int. Cl.
| | |
|---|---|
| C23C 2/40 | (2006.01) |
| C22C 38/38 | (2006.01) |
| C22C 38/32 | (2006.01) |
| C22C 38/28 | (2006.01) |
| C22C 38/22 | (2006.01) |
| C22C 38/06 | (2006.01) |
| C22C 38/02 | (2006.01) |
| C22C 38/00 | (2006.01) |
| B32B 15/01 | (2006.01) |
| C21D 9/46 | (2006.01) |
| C21D 8/02 | (2006.01) |
| C21D 6/00 | (2006.01) |
| C23G 1/08 | (2006.01) |
| C23C 2/28 | (2006.01) |
| C22C 38/60 | (2006.01) |
| C22C 38/12 | (2006.01) |
| B32B 15/04 | (2006.01) |
| C23C 30/00 | (2006.01) |
| C22C 38/18 | (2006.01) |
| C22C 38/04 | (2006.01) |
| C22C 38/14 | (2006.01) |
| C21D 8/00 | (2006.01) |
| B32B 15/18 | (2006.01) |

(52) U.S. Cl.
CPC ............ *B32B 15/043* (2013.01); *B32B 15/18* (2013.01); *C21D 6/002* (2013.01); *C21D 6/005* (2013.01); *C21D 6/008* (2013.01); *C21D 8/005* (2013.01); *C21D 8/0205* (2013.01); *C21D 8/0221* (2013.01); *C21D 8/0226* (2013.01); *C21D 8/0236* (2013.01); *C21D 8/0247* (2013.01); *C21D 8/0263* (2013.01); *C21D 8/0278* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/18* (2013.01); *C22C 38/22* (2013.01); *C22C 38/28* (2013.01); *C22C 38/32* (2013.01); *C22C 38/38* (2013.01); *C22C 38/60* (2013.01); *C23C 2/02* (2013.01); *C23C 2/06* (2013.01); *C23C 2/28* (2013.01); *C23C 2/40* (2013.01); *C23C 30/00* (2013.01); *C23C 30/005* (2013.01); *C23G 1/08* (2013.01); *C21D 2211/002* (2013.01); *C21D 2211/005* (2013.01); *C21D 2211/008* (2013.01); *Y10T 428/12611* (2015.01); *Y10T 428/12618* (2015.01); *Y10T 428/12799* (2015.01); *Y10T 428/12951* (2015.01); *Y10T 428/12958* (2015.01); *Y10T 428/12965* (2015.01); *Y10T 428/12972* (2015.01); *Y10T 428/2495* (2015.01); *Y10T 428/24967* (2015.01)

(58) Field of Classification Search
CPC .... C21D 8/0236; C21D 8/0247; C21D 8/005; C21D 8/0226; C21D 8/0263; C21D 8/0278; C21D 6/002; C21D 6/005; C21D 6/008; C21D 9/46; B32B 15/013; B32B 15/01; B32B 15/04; B32B 15/043; B32B 15/18; C22C 38/001; C22C 38/002; C22C 38/02; C22C 38/06; C22C 38/22; C22C 38/28; C22C 38/32; C22C 38/38; C22C 38/60; C22C 38/04; C22C 38/12; C22C 38/14; C22C 38/18; C23C 2/02; C23C 2/06; C23C 2/28; C23C 2/40; C23C 30/00; C23C 30/005; C23G 1/08; Y10T 428/12611; Y10T 428/12618; Y10T 428/12799; Y10T 428/12951; Y10T 428/12958; Y10T 428/12965; Y10T 428/12972; Y10T 428/2495; Y10T 428/24967

See application file for complete search history.

(56) References Cited

U.S. PATENT DOCUMENTS

2017/0137906 A1* 5/2017 Fan .................. C22C 38/00
2019/0078188 A1 3/2019 Ikeda et al.

\* cited by examiner

ALLOYED HOT-DIP GALVANIZED STEEL SHEET AND ALLOYED HOT-DIP GALVANIZED STEEL SHEET PRODUCTION METHOD

TECHNICAL FIELD

The present invention relates to a hot-dip galvannealed steel sheet and a method for manufacturing a hot-dip galvannealed steel sheet.

BACKGROUND ART

Surface-treated steel sheets having corrosion resistance or the like have been widely used in various industries, such as the automotive industry. Examples of such surface-treated steel sheets include plated steel sheets, such as hot-dip galvanized steel sheets and hot-dip galvannealed steel sheets.

In various industries, such as the automotive industry, for example, parts may be attached to plated steel sheets, or parts that cannot be directly welded to plated steel sheets may be attached to plated steel sheets during assembly of parts. In such assembly of parts, for example, parts may be attached to a plated steel sheet by welding nuts, which are used to attach parts to plated steel sheets, to the plated steel sheet and then fastening bolts into the nuts welded to the plated steel sheet. Such welding of nuts to a plated steel sheet may use projection welding in which nuts (projection nuts) having a protrusion (projection) on the bearing surface are welded to a plated steel sheet or the like. Accordingly, a welding base material having a protrusion on the bearing surface, like a projection nut, may be projection-welded to a plated steel sheet.

To reduce fuel consumption in transportation machines such as automobiles, there is a need for light-weight transportation machines. An effective way for weight reduction is to reduce the sheet thickness of plated steel sheets that constitute transportation machines. Transportation machines also need to ensure passenger safety. From these points of view, plated steel sheets that constitute transportation machines such as automobiles need to have high strength including both tensile strength and yield strength. Plated steel sheets that constitute transportation machines further need to have ductility that does not decrease with increasing strength. Therefore, plated steel sheets used for transportation machines such as automobiles need to have both high strength and high ductility.

Examples of plated steel sheets used for transportation machines and the like include the plated steel sheets described in Patent Literature 1 and Patent Literature 2.

Patent Literature 1 describes a plated steel sheet having a hot-dip galvanized layer or a hot-dip galvannealed layer on the surface of a steel sheet having a predetermined composition. The plated steel sheet includes, in sequence from the interface between the steel sheet and the hot-dip galvanized layer or the hot-dip galvannealed layer toward the steel sheet, an internal oxide layer having a predetermined thickness, a soft layer containing the internal oxide layer and having a predetermined thickness, and a hard layer. Patent Literature 1 discloses that a hot-dip galvanized steel sheet and a hot-dip galvannealed steel sheet that have high platability, high formability such as bendability and hole expandability, and high delayed fracture resistance and further have high impact resistance and a tensile strength of 980 MPa or higher are provided.

Patent Literature 2 describes a steel sheet for automotive parts, wherein the steel sheet has good nut projection weldability. The steel sheet has a predetermined chemical composition. In the steel sheet, the relationship among the sheet thickness, the carbon equivalent Ceq, and the coefficient DI, which defines the influence of each element affecting the quenching depth, is specified. Patent Literature 2 discloses that the steel sheet for automotive parts exhibits high joining strength (indentation peel strength and torque peel strength) between the steel sheet and nuts and also can reduce variations in joining strength while the steel sheet itself has high strength.

CITATION LIST

Patent Literature

Patent Literature 1: JP 2015-34334 A
Patent Literature 2: JP 2010-106343 A

SUMMARY OF INVENTION

An object of the present invention is to provide a hot-dip galvannealed steel sheet having good nut projection weldability and good platability. Another object of the present invention is to provide a method for manufacturing a hot-dip galvannealed steel sheet having good nut projection weldability and good platability.

In one aspect of the present invention, a hot-dip galvannealed steel sheet includes a steel sheet and a hot-dip galvannealed layer on the surface of the steel sheet. The steel sheet contains, in mass %, C: 0.10% or more and 0.25% or less, Si: more than 0% and 0.50% or less, Mn: more than 2.0% and 3.5% or less, P: more than 0% and 0.1% or less, S: more than 0% and 0.05% or less, Al: 0.01% or more and 0.10% or less, Ti: more than 0% and 0.1% or less, B: 0.0020% or more and 0.0050% or less, N: more than 0% and 0.01% or less, Cr: more than 0% and 0.5% or less, and Mo: more than 0% and 0.5% or less, with the balance being iron and unavoidable impurities. The steel sheet has an average oxygen concentration of 0.10 mass % or less in a region of 1 μm from the interface between the steel sheet and the hot-dip galvannealed layer toward the steel sheet. The metal microstructure of the steel sheet at a position of t/4 where t represents the sheet thickness of the hot-dip galvannealed steel sheet includes 50 to 85 area % of martensite, 15 to 50 area % of bainite, and 5 area % or less of ferrite.

In another aspect of the present invention, a method for manufacturing the hot-dip galvannealed steel sheet includes: soaking a steel having the composition of the steel sheet at 1100° C. to 1300° C., hot-rolling the steel at a finishing temperature of 850° C. to 950° C., and coiling the hot-rolled steel at 630° C. to 680° C. to provide a hot-rolled material; pickling the hot-rolled material by using 3 to 20 mass % hydrochloric acid under the condition of 60° C. to 90° C. for 35 to 200 seconds; cold-rolling the hot-rolled material after pickling to provide a cold-rolled material; annealing the cold-rolled material by soaking the cold-rolled material at $Ac_3$ point or higher and lower than 880° C. under the condition of a dew point of −25° C. or lower, cooling the soaked material to a cooling finishing temperature of 380° C. to 500° C. at 3.0° C./s or higher, and maintaining the cooled material at the cooling finishing temperature for 15 seconds or longer to provide a steel sheet; and subjecting the steel sheet to a plating process to form the hot-dip galvannealed layer on the steel sheet.

These and other objects, features and advantages of the present invention will be apparent from the following detailed description.

DESCRIPTION OF EMBODIMENTS

During attachment of parts, by using bolts, to a plated steel sheet having nuts welded thereto by projection welding, weld zones between the plated steel sheet and the nuts may be peeled to reduce productivity. According to the studies carried out by the inventors of the present invention and the like, the projection welding of nuts to a known high-strength plated steel sheet, such as the high-strength plated steel sheet described in Patent Literature 1, may tend to cause peeling of weld zones between the plated steel sheet and the nuts.

The inventors and the like have investigated the peeling of the weld zones and, as a result, have observed a Si-based oxide at the weld interface and found that the Si-based oxide present at the weld interface causes peeling. It is also found that the amount of the generated oxide decreases as the coiling temperature in hot rolling decreases and as the oxidizing performance in annealing decreases.

To strengthen a steel sheet, for example, a method for forming what is called a high-alloy steel by increasing the amount of additive elements, such as Si and Mn, may be used. As the amount of additive elements increases accordingly, platability tends to decrease, and bare spots and uneven alloying tend to be generated. Such a decrease in platability may cause low productivity and low cost performance due to low yields. The decrease in platability may result, for example, from reduced wettability of molten Zn due to enrichment of Si and Mn in the steel sheet surface and subsequent formation of an oxide coating or from reduced dispersion of Fe with increasing amount of substitutional elements, such as Si and Mn. An effective way of suppressing a decrease in platability is to reduce the amounts of platability-affecting elements or to fix these elements in the form of oxides near the steel sheet surface. Examples of the method for fixing platability-affecting elements in the form of oxides near the steel sheet surface include increasing the coiling temperature in hot rolling, or performing an oxidation-reduction treatment using a NOF (non-oxygen furnace)-type annealing furnace.

For example, in the high-strength plated steel sheet described in Patent Literature 1, the Si content is as high as 0.5 to 2.5 mass %. To ensure platability, an internal oxide layer is actively formed in the surface area of the steel sheet by increasing the coiling temperature in hot rolling, or maintaining the steel sheet at high temperature after coiling in hot rolling. In subsequent annealing, Si and Mn are oxidized inside by using the oxidation-reduction method. This improves platability and bendability as disclosed in Patent Literature 1. However, no study has been made to improve the nut projection weldability of the high-strength plated steel sheet described in Patent Literature 1. Although there has been a study to improve the nut projection weldability of the plated steel sheet described in Patent Literature 2, no study has been made to ensure platability. Specifically, the study about the influence of the oxide layer in the surface area of the steel sheet to ensure platability has not been carried out. According to the studies carried out by the inventors and the like, it is thus found that known high-strength plated steel sheets, such as the high-strength plated steel sheet described in Patent Literature 1 and the plated steel sheet described in Patent Literature 2, may fail to have good nut projection weldability and good platability.

As a result of various studies, the inventors and the like have found that the above objects of providing a hot-dip galvannealed steel sheet having good nut projection weldability and good platability and a method for manufacturing the hot-dip galvannealed steel sheet are accomplished by the following present invention.

The inventors and the like focus on improving nut projection weldability by adjusting the oxygen concentration in the surface area of the steel sheet. To achieve this, the fraction of microstructures, the oxygen concentration in the surface area, and the like are also adjusted by adjusting the plated steel sheet manufacturing conditions, such as the coiling temperature in hot rolling and the annealing conditions, using a steel whose composition, such as Si content, has been adjusted. It is accordingly found that it is possible to adjust both nut projection weldability and platability while providing a high-strength plated steel sheet, thereby completing the present invention as described below. The expression "good nut projection weldability (high nut projection weldability)" means that the load (nut weld peeling load) in peeling a projection-welded nut under a load on the nut is 3200 N or higher. As used herein, the term "high strength" means that the tensile strength is 1100 to 1300 MPa and the yield strength is 800 MPa or higher.

The embodiments according to the present invention will be described below, but the present invention is not limited to these embodiments.

A plated steel sheet according to an embodiment of the present invention is a hot-dip galvannealed steel sheet including a steel sheet and a hot-dip galvannealed layer on the surface of the steel sheet. The steel sheet (base steel sheet) has the composition including, in mass %, C: 0.10% or more and 0.25% or less, Si: more than 0% and 0.50% or less, Mn: more than 2.0% and 3.5% or less, P: more than 0% and 0.1% or less, S: more than 0% and 0.05% or less, Al: 0.01% or more and 0.10% or less, Ti: more than 0% and 0.1% or less, B: 0.0020% or more and 0.0050% or less, N: more than 0% and 0.01% or less, Cr: more than 0% and 0.5% or less, and Mo: more than 0% and 0.5% or less, with the balance being iron and unavoidable impurities. The steel sheet has an average oxygen concentration of 0.10 mass % or less in the region (surface area) of 1 μm from the interface between the steel sheet and the hot-dip galvannealed layer toward the steel sheet. The metal microstructure of the steel sheet at a position of t/4 where t represents the sheet thickness of the hot-dip galvannealed steel sheet includes 50 to 85 area % of martensite, 15 to 50 area % of bainite, and 5 area % or less of ferrite.

When the hot-dip galvannealed steel sheet includes a steel sheet that has the composition as described above, in which the average oxygen concentration in the surface area and the metal microstructure at a position of t/4 are in the above ranges, and that includes a hot-dip galvannealed layer on the surface of the steel sheet, the hot-dip galvannealed steel sheet has good platability and good nut projection weldability while having high strength. The hot-dip galvannealed steel sheet specifically has high strength as high as a tensile strength of 1100 to 1300 MPa and a yield strength of 800 MPa or higher and further has an elongation of 8.0% or more. The hot-dip galvannealed steel sheet is a plated steel sheet having good nut projection weldability and good platability. The hot-dip galvannealed steel sheet can be suitably used for automobiles.

[Average Oxygen Concentration in Surface Area]

The average oxygen concentration in the surface area of the steel sheet is 0.10 mass % or less. Since the average oxygen concentration in the surface area of the steel sheet is in the above range, the hot-dip galvannealed steel sheet has good nut projection weldability while having good platability and high strength. To obtain this effect effectively, the upper limit of the average oxygen concentration in the surface area is 0.10 mass % or less, preferably 0.09 mass % or less, and more preferably 0.08 mass % or less. If the average oxygen concentration in the surface area is too high, the nut projection weldability tends to be low, specifically, the nut weld peeling load tends to be low. The average oxygen concentration in the surface area is preferably as low as possible and most preferably 0 mass %. Specifically, the lower limit of the average oxygen concentration in the surface area is preferably 0.03 mass % or more, more preferably 0.02 mass % or more, still more preferably 0.01 mass % or more, and most preferably 0 mass % or more. When the average oxygen concentration in the surface area is in the above range, the nut projection weldability is preferable. Specifically, when the average oxygen concentration is 0.10 mass % or less, it is possible to ensure a nut weld peeling load of 3200 N or higher.

The interface between the hot-dip galvannealed layer and the steel sheet means the interface between a main component-rich layer in the hot-dip galvannealed layer and a main component Fe-rich layer in the steel sheet in the sheet thickness direction of the hot-dip galvannealed steel sheet. For example, in the case of a hot-dip galvannealed steel sheet, the interface refers to the face where the Fe content is the same as the Zn content. The term "surface area" as used herein refers to a region of 1 μm from the interface between the steel sheet and the hot-dip galvannealed layer toward the steel sheet, that is, a region from the interface to a depth of 1 μm.

The average oxygen concentration in the surface area can be calculated from the profile of the oxygen concentration from the steel sheet surface in the depth direction (sheet thickness direction) determined by glow discharge optical emission spectrometry (GROES). The average oxygen concentration in the surface area is the arithmetic mean of the oxygen concentration in the region from the interface between the hot-dip galvannealed layer and the steel sheet to a position of 1 μm toward the inside in the sheet thickness direction. For a hot-dip galvanized steel sheet, which is an example plated steel sheet, the concentration profiles for Fe, Mn, Si, C, O, Zn, and Cr are also determined by GDOES. The average oxygen concentration in the surface area in the hot-dip galvanized steel sheet is the arithmetic mean of the oxygen concentration in the region of 1 μm from the interface toward the inside in the sheet thickness direction, where the positions of the concentration profiles at which the Fe concentration is the same as the Zn concentration are assumed to be the interface between the hot-dip galvannealed layer and the steel sheet.

[Metal Microstructure]

The metal microstructure of the steel sheet at the position of t/4 includes 50 to 85 area % of martensite, 15 to 50 area % of bainite, and 5 area % or less of ferrite. The position of t/4 is the position at a depth of t/4 in the sheet thickness direction from the surface of the hot-dip galvannealed steel sheet, where t represents the sheet thickness of the hot-dip galvannealed steel sheet. The position of t/4 is deeper than the region (surface area) of 1 μm from the interface between the steel sheet and the hot-dip galvannealed layer toward the steel sheet.

The lower limit of the area fraction of martensite in the metal composition at the position of t/4, that is, in the metal microstructure of the steel sheet (base steel sheet) other than the surface area, is 50 area % or more, preferably 51 area % or more, and still more preferably 52 area % or more. The upper limit of the area fraction of martensite is 85 area % or less, preferably 83 area % or less, and more preferably 82 area % or less.

The lower limit of the area fraction of bainite is 15 area % or more, preferably 17 area % or more, and still more preferably 18 area % or more. The upper limit of the area fraction of bainite is 50 area % or less, preferably 49 area % or less, and more preferably 48 area % or less.

A region other than the surface area in the steel sheet (base steel sheet) may have a metal microstructure composed of martensite and bainite and may include other microstructures other than martensite and bainite. Examples of other microstructures include ferrite, perlite, and retained austenite. Retained austenite is determined by, for example, X-ray diffraction. For example, the upper limit of the area fraction of ferrite among these microstructures is 5 area % or less, preferably 4 area % or less, and more preferably 3 area % or less. The area fraction of ferrite at the position of t/4 may be 0 area %, that is, the lower limit of the area fraction of ferrite is 0 area % or more, preferably 1 area % or more, and more preferably 2 area % or more.

When the metal microstructure at the position of t/4, that is, the metal microstructure of a region other than the surface area in the steel sheet (base steel sheet), is as described above, a high-strength hot-dip galvannealed steel sheet, specifically, a hot-dip galvannealed steel sheet having a tensile strength of 1100 to 1300 MPa, a yield strength of 800 MPa or higher, and an elongation of 8.0% or higher, can be obtained.

The area fraction of metal microstructures can be, for example, determined as described. The Nital-corroded cross-section of the hot-dip galvannealed steel sheet at the position of t/4 is observed with a scanning electron microscope (SEM). The metal microstructures (martensite, bainite, and ferrite) are identified according to this observation. The area fraction of each metal microstructure is obtained by determining the area ratio of regions occupied by these metal microstructures.

Next, the composition of the hot-dip galvannealed steel sheet according to this embodiment will be described. The unit "%" in the following composition means the unit "mass %".

[C: 0.10% or More and 0.25% or Less]

Carbon C is an element that contributes to improvement in the strength of the steel sheet. To ensure the strength of the steel sheet, the C content is 0.10% or more, preferably 0.11% or more, and more preferably 0.12% or more. However, if the C content is too high, the steel sheet after hot rolling has high strength, which causes, for example, cracking during cold rolling, that is, degrades cold rolling properties. Therefore, the C content is 0.25% or less, preferably 0.23% or less, and more preferably 0.20% or less.

[Si: More Than 0% and 0.50% or Less]

Silicon Si is known as a solid solution strengthening element and effectively improves the strength while suppressing a decrease in ductility. To obtain this effect, Si is contained. Specifically, the Si content is more than 0%, preferably 0.050% or more, and more preferably 0.10% or more. However, if the Si content is too high, bare spots and the like are generated, or nut projection weldability is degraded. Therefore, the Si content is 0.50% or less, preferably 0.48% or less, and more preferably 0.46% or less.

[Mn: More Than 2.0% and 3.5% or Less]

Manganese Mn is an element that contributes to improvement in the strength of the steel sheet. To obtain this effect effectively, the Mn content is more than 2.0%, preferably 2.1% or more, and more preferably 2.2% or more. However, if the Mn content is too high, the strength after hot rolling is high, which causes, for example, cracking during cold rolling, that is, degrades cold rolling properties. Therefore, the Mn content is 3.5% or less, preferably 3.3% or less, and more preferably 3.0% or less.

[P: More Than 0% and 0.1% or Less]

Phosphorus P is an unavoidably contained element and degrades the formability of the steel sheet. Therefore, the P content is 0.1% or less, preferably 0.08% or less, and more preferably 0.06% or less. Since the P content is preferably as low as possible, the P content is more than 0% and, for example, 0.0005% or more from an industrial viewpoint.

[S: More Than 0% and 0.05% or Less]

Sulfur S is an unavoidably contained element like P and forms a sulfide such as MnS to degrade formability such as bendability of the steel sheet. Therefore, the S content is 0.05% or less, preferably 0.03% or less, and more preferably 0.01% or less. Since the S content is preferably as low as possible, the S content is more than 0% and, for example, 0.0001% or more from an industrial viewpoint.

[Al: 0.01% or More and 0.10% or Less]

Aluminum Al is an element that acts as a deoxidizer. To obtain this effect effectively, the Al content is 0.01% or more, and preferably 0.02% or more. However, even if the Al content is too high, the effect of Al is saturated. For cost reduction, the Al content is 0.10% or less, preferably 0.09% or less, and more preferably 0.08% or less.

[Ti: More Than 0% and 0.1% or Less)]

Titanium Ti forms TiN to suppress a decrease in the effect of B caused as a result of bonding of B and N. Specifically, the Ti content is more than 0%, preferably 0.005% or more, and more preferably 0.01% or more. However, if the Ti content is too high, the steel sheet after hot rolling has high strength, which causes, for example, cracking during cold rolling, that is, degrades cold rolling properties. Therefore, the Ti content is 0.1% or less, preferably 0.09% or less, and more preferably 0.08% or less.

[B: 0.0020% or More and 0.0050% or Less]

Boron B is an element that suppresses precipitation of high-temperature transformation phases and can increase the strength of the steel sheet. To obtain this effect effectively, the B content is 0.0020% or more, preferably 0.0022% or more, and more preferably 0.0024% or more. However, even if the B content is too high, the effect of B is saturated. For cost reduction, the B content is 0.0050% or less, preferably 0.0048% or less, and more preferably 0.0046% or less.

[N: More Than 0% and 0.01% or Less]

Nitrogen N is an unavoidably contained element like P and forms BN to reduce the dissolved B content and thus to suppress precipitation of high-temperature transformation phases. To obtain sufficient effect of B, the N content is 0.01% or less, preferably 0.008% or less, and more preferably 0.006% or less. Since the N content is preferably as low as possible, the N content is more than 0%.

[Cr: More Than 0% and 0.5% or Less]

Chromium Cr is an element effective in improving hardenability to increase the strength of the steel sheet. To obtain this effect, Cr is contained. Specifically, the Cr content is more than 0%, preferably 0.05% or more, and more preferably 0.1% or more. However, if the Cr content is too high, platability decreases. Therefore, the Cr content is 0.5% or less, and preferably 0.4% or less.

[Mo: More Than 0% and 0.5% or Less]

Molybdenum Mo is an element effective in improving the strength of the steel sheet. To obtain this effect, Mo is contained. Specifically, the Mo content is more than 0%, and preferably 0.05% or more. However, even if the Mo content is too high, the effect of Mo is saturated. For cost reduction, the Mo content is 0.5% or less, and preferably 0.4% or less.

[Other Components]

The steel sheet satisfies the above-described composition, and the balance is iron and unavoidable impurities. The unavoidable impurities may include, for example, tramp elements such as O, Pb, Bi, Sb, and Sn, which may be incorporated together with P, S, and N into steel depending on conditions, such as raw materials, materials, and manufacturing facility. The unavoidable impurities as used herein are impurities other than P, S, and N, and examples of the unavoidable impurities include tramp elements, such as O, Pb, Bi, Sb, and Sn.

The steel sheet may contain elements, such as Nb, V, Cu, and Ni, in the following ranges as desired, and the properties of the hot-dip galvannealed steel sheet are further improved according to the type of contained element. These elements can be contained alone or in any combination so as to fall within the following ranges.

[Nb: 0% or More and 0.2% or Less]

Niobium Nb is an element effective in refining the microstructure of the steel sheet or precipitating the carbide in the steel sheet to improve the strength of the steel sheet, and Nb may be contained as desired. To obtain this effect effectively, the Nb content is preferably more than 0%. Since the steel sheet does not necessarily contain Nb, the Nb content is 0% or more. However, if the Nb content is too high, the steel sheet tends to have low weldability and low toughness, and the Nb content is thus preferably 0.2% or less.

[V: 0% or More and 0.2% or Less]

Vanadium V is an element effective in refining the microstructure of the steel sheet or precipitating the carbide in the steel sheet to improve the strength of the steel sheet, and V may be contained as desired. To obtain this effect effectively, the V content is preferably more than 0%. Since the steel sheet does not necessarily contain V, the V content is 0% or more. However, if the V content is too high, the steel sheet tends to have low weldability and low toughness, and the V content is thus preferably 0.2% or less.

[Cu: 0% or More and 1% or Less]

Copper Cu is an element effective in improving the corrosion resistance of the steel sheet and accordingly improving the delayed fracture resistance, and Cu may be contained as desired. To obtain this effect effectively, the Cu content is preferably more than 0%. Since the steel sheet does not necessarily contain Cu, the Cu content is 0% or more. However, if the Cu content is too high, the steel sheet tends to have low formability, and the Cu content is thus preferably 1% or less.

[Ni: 0% or More and 1% or Less]

Nickel Ni is an element effective in improving the corrosion resistance of the steel sheet and accordingly improving the delayed fracture resistance, and Ni may be contained as desired. To obtain this effect effectively, the Ni content is preferably more than 0%. Since the steel sheet does not necessarily contain Ni, the Ni content is 0% or more.

However, if the Ni content is too high, the steel sheet tends to have low formability, and the Ni content is thus preferably 1% or less.

[Hot-Dip Galvannealed Layer]

The hot-dip galvannealed layer is not limited and is any hot-dip galvannealed layer included in a hot-dip galvannealed steel sheet. The deposition weight (plating deposition weight) of the hot-dip galvannealed layer is preferably 45 to 65 g/m² per surface.

The hot-dip galvannealed steel sheet has high strength as described above. Specifically, the lower limit of the tensile strength is preferably 1100 MPa or higher, and more preferably 1150 MPa or higher. The tensile strength is preferably as high as possible but actually 1300 MPa or lower although the tensile strength is not limited. The upper limit of the tensile strength is 1300 MPa or lower if it is mentioned. The lower limit of the yield strength is preferably 800 MPa or higher and more preferably 810 MPa or higher. The upper limit of the yield strength is 980 MPa or lower in order to prevent a decrease in elongation.

The lower limit of the elongation of the hot-dip galvannealed steel sheet is preferably 8.0% or more and more preferably 8.2% or more. The elongation is preferably as high as possible and not limited.

The tensile strength, yield strength, and elongation are measured by, for example, the tensile test in accordance with JIS Z 2241:2011.

[Method for Manufacturing Hot-Dip Galvannealed Steel Sheet]

Next, the method for manufacturing the hot-dip galvannealed steel sheet according to this embodiment will be described.

The method for manufacturing the hot-dip galvannealed steel sheet according to this embodiment is the method for manufacturing the hot-dip galvannealed steel sheet described above. In this manufacturing method, first, a steel having the same composition as the steel sheet is soaked at 1100° C. to 1300° C. and hot-rolled at a finishing temperature of 850° C. to 950° C., and the hot-rolled steel is coiled at 630° C. to 680° C. to provide a hot-rolled material (hot rolling step). Next, the hot-rolled material is pickled by using 3 to 20 mass % hydrochloric acid under the condition of 60° C. to 90° C. for 35 to 200 seconds (pickling step). Next, the hot-rolled material after pickling is cold-rolled to provide a cold-rolled material (cold rolling step). Next, the cold-rolled material is annealed by soaking the cold-rolled material at $Ac_3$ point or higher and lower than 880° C. under the condition of a dew point of −25° C. or lower, cooling the soaked material to a cooling finishing temperature of 380° C. to 500° C. at 3.0° C./s or higher, and maintaining the cooled material at the cooling finishing temperature for 15 seconds or longer to provide a steel sheet (annealing step). Finally, the steel sheet is subjected to the plating process to form the hot-dip galvannealed layer on the steel sheet (plating step). As described above, the manufacturing method includes, in sequence, the hot rolling step, the pickling step, the cold rolling step, the annealing step, and the plating step. According to this manufacturing method, a hot-dip galvannealed steel sheet having good nut projection weldability and good platability as described above can be suitably manufactured.

Each step will be described below.

[Hot Rolling Step]

First, the hot rolling step is performed. In the hot rolling step, first, a billet obtained by melting a steel in accordance with an ordinary method and then subjecting the molten steel to continuous casting is soaked to 1100° C. to 1300° C. in a heating furnace. The billet has the above-described composition.

The heated billet is transferred to a hot rolling line and hot-rolled, by a rolling mill, to a steel sheet (hot-rolled material) having a predetermined thickness. This hot rolling is completed within a predetermined finishing temperature range. Subsequently, the hot-rolled material is coiled at a predetermined coiling temperature by using a coiler or the like. In this embodiment, the finishing temperature is 850° C. to 950° C., and the coiling temperature is 630° C. to 680° C.

If the soaking temperature is too low, additive elements tend to be less dissolved. If the soaking temperature is too high, oxide scales tend to be thick, which increases the time for scale removal or the like and results in low productivity. When the soaking temperature is in the above-described range, carbides and the like are dissolved well to provide a uniform annealed sheet microstructure.

If the finishing temperature is too low, the annealed sheet tends to have an uneven microstructure, which results in low elongation. If the finishing temperature is too high, the annealed sheet tends to have a coarse microstructure, which results in low elongation. When the finishing temperature is in the above-described range, the annealed sheet has a uniform microstructure, which improves formability.

If the coiling temperature is too low, the hot-rolled sheet has high strength, so that the cold rolling properties tend to deteriorate or the platability tends to decrease. If the coiling temperature is too high, the average oxygen concentration in the surface area tends to be high. When the coiling temperature is in the above-described range, high platability and high nut weldability are both obtained.

[Pickling Step]

Next, the pickling step is performed. In the pickling step, the steel sheet (hot-rolled material) uncoiled from the coil is dipped in a pickling solution. Specifically, the steel sheet (hot-rolled material) is pickled by using 3 to 20 mass % hydrochloric acid as a pickling solution under the condition of a pickling solution temperature of 60° C. to 90° C. for a pickling time of 35 to 200 seconds.

The lower limit of the hydrochloric acid concentration of the pickling solution is 3 mass % or more, preferably 5 mass % or more, and more preferably 7 mass % or more. The upper limit of the hydrochloric acid concentration of the pickling solution is 20 mass % or less, preferably 19 mass % or Less, and more preferably 18 mass % or less.

The lower limit of the pickling solution temperature is 60° C. or higher, preferably 65° C. or higher, and more preferably 70° C. or higher. The upper limit of the pickling solution temperature is 90° C. or lower, preferably 88° C. or lower, and more preferably 85° C. or lower.

The lower limit of the pickling time is 35 seconds or longer and preferably 40 seconds or longer. The upper limit of the pickling time is 200 seconds or shorter, preferably 180 seconds or shorter, and more preferably 160 seconds or shorter.

If the hydrochloric acid concentration of the pickling solution is too low, the pickling performance tends to be insufficient. If the pickling solution temperature is too low or if the pickling time is too short, the pickling performance tends to be insufficient. If the pickling performance is insufficient, the removal of scales generated by hot rolling tends to be insufficient. This tends to degrade the texture of the steel sheet surface and tends to damage to the surface of a mill roll, resulting in low productivity. Even if the steel sheet is excessively pickled by, for example, increasing the hydrochloric acid concentration of the pickling solution, increasing the temperature of the pickling solution, and extending the pickling time, the effect of scale removal is saturated.

[Cold Rolling Step]

First, the cold rolling step is performed. In the cold rolling step, the pickled steel sheet (hot-rolled material) is rolled to a predetermined thickness at room temperature. Examples of the cold rolling include, but are not limited to, known cold rolling in accordance with an ordinary method.

[Annealing Step]

Next, the annealing step is performed. In the annealing step, the cold-rolled steel sheet (cold-rolled material) is soaked at a temperature of $Ac_3$ point or higher and lower than 880° C. under the condition of a dew point of −25° C. or lower, and the soaked material is then cooled to a cooling finishing temperature of 380° C. to 500° C. at an average cooling rate of 3.0° C./s or higher and maintained at the cooling finishing temperature for 15 seconds or longer.

The lower limit of the soaking temperature is $Ac_3$ point or higher, and preferably $Ac_3$ point+10° C. or higher. The upper limit of the soaking temperature is lower than 880° C. The $Ac_3$ point is defined in formula (1) below.

$$Ac_3(° C.)=910-203\times[C]^{1/2}+44.7\times[Si]-30\times[Mn]+700\times[P]+400\times[Al]+400\times[Ti]+104\times[V]-11\times[Cr]+31.5\times[Mo]-20\times[Cu]-15.2\times[Ni] \quad (3)$$

If the soaking temperature is too low, the strength tends to be low. If the soaking temperature is too high, the nut weldability tends to be low, or the elongation tends to be low. This may be because the average oxygen concentration in the surface area (surface area oxygen concentration) increases with increasing soaking temperature. When the soaking temperature is in the above-described range, desired strength and desired elongation are obtained.

The lower limit of the dew point is preferably −55° C. or higher, and more preferably −50° C. or higher. The upper limit of the dew point is −25° C., preferably −30° C. or lower, and more preferably −35° C. or lower.

If the dew point is too low, it is necessary to increase the gas flow rate, and the manufacturing costs tend to increase. If the dew point is too high, the nut projection weldability tends to be low. This may be because the average oxygen concentration in the surface area is high and the amount of the Si-based oxide present at the weld interface is large.

The lower limit of the soaking time in the soaking step is preferably 20 seconds or longer and more preferably 30 seconds or longer. The upper limit of the soaking time is 150 seconds or shorter, and preferably 140 seconds or shorter. If the soaking time is too short, the reverse transformation behavior tends to be insufficient, and the strength tends to be low. If the soaking time is too long, a coarse microstructure tends to be formed to reduce elongation. When the soaking time is in the above-described range, desired tensile properties are obtained.

The atmosphere of the soaking step is preferably, for example, a mixed gas atmosphere ($N_2$-4% $H_2$) containing a mixture of $N_2$ and 4 vol % $H_2$.

The lower limit of the average cooling rate is 3.0° Us or higher, and preferably 3.2° C./s or higher. The upper limit of the average cooling rate is preferably 15.0° C./s or lower, and more preferably 14.8° C./s or lower.

If the average cooling rate is too low, the strength tends to be low. If the average cooling rate is too high, the production stability tends to be low, and the manufacturing costs tend to be high. When the average cooling rate is in the above-described range, the precipitation of high-tempera-ture transformation phases tends to be suppressed, and a desired tensile strength tends to be obtained.

The lower limit of the cooling finishing temperature is 380° C. or higher, preferably 390° C. or higher, and more preferably 400° C. or higher. The upper limit of the cooling finishing temperature is 500° C. or lower, preferably 490° C. or lower, and more preferably 480° C. or lower.

If the cooling finishing temperature is too low, the strength tends to be high, and the elongation tends to be low. If the cooling finishing temperature is too high, the strength tends to be high, and the elongation tends to be low. When the cooling finishing temperature is in the above-described range, desired tensile properties are obtained.

The lower limit of the holding time at the cooling finishing temperature is 15 seconds or longer and preferably 20 seconds or longer. The upper limit of the holding time is preferably 150 seconds or shorter, and preferably 140 seconds or shorter.

If the holding time is too short, the strength tends to be high, and the elongation tends to be low. If the holding time is too long, the strength tends to be low. When the holding time is in the above-described range, desired tensile properties are obtained.

[Plating Step]

Next, the plating step is performed. In the plating step, the steel sheet (annealed material) obtained in the annealing step is subjected to the hot-dip galvannealing process. In the hot-dip galvannealing process, specifically, for example, the steel sheet (annealed material) obtained in the annealing step is maintained at the cooling finishing temperature, then dipped in a galvanizing bath, and subjected to the alloying process at 500° C. to 600° C. The plating step is a preferably such that the deposition weight (plating deposition weight) of the hot-dip galvannealed layer is 45 to 65 g/per surface.

The hot-dip galvannealed steel sheet according to this embodiment can be manufactured through the above-described steps.

The present specification discloses techniques according to various aspects as described above, and the main techniques among them are summarized below.

In one aspect of the present invention, a hot-dip galvannealed steel sheet includes a steel sheet and a hot-dip galvannealed layer on the surface of the steel sheet. The steel sheet contains, in mass %, C: 0.10% or more and 0.25% or less, Si: more than 0% and 0.50% or less, Mn: more than 2.0% and 3.5% or less, P: more than 0% and 0.1% or less, S: more than 0% and 0.05% or less, Al: 0.01% or more and 0.10% or less, Ti: more than 0% and 0.1% or less, B: 0.0020% or more and 0.0050% or less, N: more than 0% and 0.01% or less, Cr: more than 0% and 0.5% or less, and Mo: more than 0% and 0.5% or less, with the balance being iron and unavoidable impurities. The steel sheet has an average oxygen concentration of 0.10 mass % or less in a region of 1 μm from the interface between the steel sheet and the hot-dip galvannealed layer toward the steel sheet. The metal microstructure of the steel sheet at a position of t/4 where t represents the sheet thickness of the hot-dip galvannealed steel sheet includes 50 to 85 area % of martensite, 15 to 50 area % of bainite, and 5 area % or less of ferrite.

According to this configuration, a hot-dip galvannealed steel sheet having good nut projection weldability and good platability can be provided. Specifically, a hot-dip galvannealed steel sheet having good nut projection weldability and good platability can be provided although it is a high-strength plated steel sheet having a tensile strength of 1100 MPa to 1300 MPa, a yield strength of 800 MPa or more, and an elongation of 8.0% or more. The hot-dip galvannealed steel sheet can be suitably used for automobiles.

In another aspect of the present invention, a method for manufacturing the hot-dip galvannealed steel sheet includes: soaking a steel having the composition of the steel sheet at 1100° C. to 1300° C., hot-rolling the steel at a finishing temperature of 850° C. to 950° C., and coiling the hot-rolled steel at 630° C. to 680° C. to provide a hot-rolled material; pickling the hot-rolled material by using 3 to 20 mass % hydrochloric acid under the condition of 60° C. to 90° C. for 35 to 200 seconds; cold-rolling the hot-rolled material after pickling to provide a cold-rolled material; annealing the cold-rolled material by soaking the cold-rolled material at $Ac_3$ point or higher and lower than 880° C. under the condition of a dew point of −25° C. or lower, cooling the soaked material to a cooling finishing temperature of 380° C. to 500° C. at 3.0° C./s or higher, and maintaining the cooled material at the cooling finishing temperature for 15 seconds or longer to provide a steel sheet; and subjecting the steel sheet to a plating process to form the hot-dip galvannealed layer on the steel sheet.

According to this configuration, a hot-dip galvannealed steel sheet having good nut projection weldability and good platability can be suitably manufactured.

According to the present invention, a hot-dip galvannealed steel sheet having good nut projection weldability and good platability can be provided. In addition, a method for manufacturing a hot-dip galvannealed steel sheet having good nut projection weldability and good platability can be provided.

EXAMPLES

The present invention will be specifically described below by way of examples, which should not be construed as limiting the present invention. Various modifications are possible without departing from the gist of the present invention, and any of the modifications is within the technical scope of the present invention.

Experiment Nos. 1 to 16

[Composition of Steel]

First, steels having the compositions of steel types a to g shown in Table 1 (the balance was iron and unavoidable impurities) were melted, and the molten steels (billets) were subjected to hot rolling, pickling, cold rolling, annealing, and plating to provide plated steel sheets. In addition, steels having the compositions of steel types h and i shown in Table 1 (the balance was iron and unavoidable impurities) were melted, and the molten steels (billets) (120 mm square×350 mm) (lab materials: steel types h, i) were subjected to hot rolling, pickling, cold rolling, annealing, and plating to provide plated steel sheets. Table 1 also shows the $Ac_3$ point of the steel sheets having the compositions of the steel types a to i. The steel sheets manufactured so as to have the compositions of the steel types a to g are steel sheets manufactured in the actual facility. The steel sheets manufactured so as to have the compositions of the steel types h and i are steel sheets manufactured in the lab facility.

TABLE 1

| Steel Type | Composition (mass %) | | | | | | | | | | | $Ac_3$ Point (° C.) |
|---|---|---|---|---|---|---|---|---|---|---|---|---|
| | C | Si | Mn | P | S | Al | Ti | B | N | Cr | Mo | |
| a | 0.15 | 0.3 | 2.5 | 0.01 | 0.001 | 0.05 | 0.02 | 0.003 | 0.002 | 0.2 | 0.1 | 806 |
| b | 0.12 | 0.1 | 2.7 | 0.01 | 0.002 | 0.05 | 0.07 | — | 0.002 | 0.3 | 0.1 | 818 |
| c | 0.09 | 1.8 | 2.1 | 0.01 | 0.003 | 0.05 | 0.06 | — | 0.002 | 0.2 | — | 915 |
| d | 0.13 | 1.0 | 2.4 | 0.01 | 0.001 | 0.02 | 0.03 | 0.003 | 0.002 | 0.3 | — | 833 |
| e | 0.09 | 1.5 | 2.2 | 0.01 | 0.001 | 0.02 | 0.02 | 0.003 | 0.002 | 0.2 | — | 871 |
| f | 0.20 | 1.9 | 2.1 | 0.01 | 0.001 | 0.04 | — | — | 0.002 | — | — | 864 |
| g | 0.15 | 0.1 | 2.6 | 0.01 | 0.002 | 0.05 | 0.04 | 0.003 | 0.002 | 0.2 | 0.1 | 801 |
| h | 0.14 | 0.3 | 2.3 | 0.01 | 0.001 | 0.02 | 0.02 | 0.003 | 0.004 | 0.5 | — | 796 |
| i | 0.14 | 0.6 | 2.3 | 0.01 | 0.001 | 0.02 | 0.02 | 0.003 | 0.004 | 0.5 | — | 809 |

<Experiment Nos. 1 to 13 (Examples Manufactured in Actual Facility Using Steel Types a to g)>

[Hot Rolling]

The manufactured billets (steel types a to g) were soaked at 1100° C. to 1300° C., hot-rolled at a finishing temperature of 850° C. to 950° C., and coiled at the coiling temperatures shown in Table 2 below.

[Pickling]

(Experiment Nos. 1 to 9, and 11 to 13)

The coiled steel sheets (hot-rolled materials) were pickled by dipping in multiple pickling tanks containing hydrochloric acid with an average concentration of 10 mass %. Specifically, the hot-rolled materials were dipped for 40 seconds in a pickling solution having a liquid temperature (pickling solution temperature) of 85° C.

(Experiment No. 10)

The pickling step in Experiment No. 10 was the same as the pickling step in Experiment Nos. 1 to 9 and 11 to 13 except that the pickling time was changed from 40 seconds to 150 seconds.

[Annealing]

The cold-rolled materials were annealed by using an all radiant tube-type annealing furnace or a NOF-type annealing furnace as an annealing furnace. In Table 2, the case of using an all radiant tube-type annealing furnace is indicated by 1 in the section of the furnace, and the case of using a NOF-type annealing furnace is indicated by 2 in the section of the furnace.

1. Case of Using All Radiant Tube-Type Annealing Furnace

The cold-rolled materials were soaked at the soaking temperatures shown in Table 2 under the conditions of the dew points shown in Table 2 for the soaking times shown in Table 2 in a mixed gas atmosphere ($N_2$-4% $H_2$) containing a mixture of $N_2$ and 4 vol % $H_2$. Subsequently, the soaked materials were cooled to the cooling finishing temperatures shown in Table 2 at the cooling rates (average cooling rates) shown in Table 2. The cooled materials were then maintained at the cooling finishing temperatures shown in Table 2 for the holding times shown in Table 2.

2. Case of Using NOF-Type Annealing Furnace

In the case of using a NOF-type annealing furnace, the oxidation step is followed by the reduction step. After the cold-rolled materials were subjected to the oxidation step, the cold-rolled materials that had been subjected to the oxidation step were soaked at the soaking temperatures shown in Table 2 under the condition of the dew points shown in Table 2 when subjected to the reduction step. Subsequently, the soaked materials were cooled to the cooling finishing temperatures shown in Table 2 at the cooling rates (average cooling rates) shown in Table 2. The cooled materials were then maintained at the cooling finishing temperatures shown in Table 2 for the holding times shown in Table 2. It is noted that the oxidation step was carried out in an atmosphere having an air ratio of 0.9 to 1.2, and the reduction step was carried out in a mixed gas atmosphere ($N_2$-15% $H_2$) containing a mixture of $N_2$ and 15 vol % $H_2$.

[Plating Process]

The annealed steel sheets (annealed materials) were maintained at the cooling finishing temperatures, then dipped in a galvanizing bath, and subjected to the alloying process at 500° C. to 600° C. The hot-dip galvannealed steel sheets according to Experiment Nos. 1 to 13 were accordingly produced as plated steel sheets.

[Average Oxygen Concentration in Surface Area]

The average oxygen concentration in the surface area of each of the hot-dip galvannealed steel sheets according to Experiment Nos. 1 to 13 was measured by glow discharge optical emission spectrometry (GDOES). By using the test pieces used in the peel test for measuring the nut peeling load described below, the oxygen concentration in a region that was not affected by welding and the peel test was measured.

The concentration profiles of Fe and Zn in the hot-dip galvannealed steel sheets from the surface in the sheet thickness direction were determined, and the positions of the concentration profiles at which the Fe concentration was the same as the Zn concentration were defined as the interface between the hot-dip galvannealed layer and the steel sheet. The profile of the oxygen concentration in the hot-dip galvannealed steel sheets from the surface in the sheet thickness direction was determined, and the average value of the oxygen concentration in a region (surface area) of 1 µm from the interface to a position of 1 µm toward the inside in the sheet thickness direction was calculated. This average value is the average oxygen concentration in the surface area.

The GDOES measurement conditions were as described below.

Apparatus: GDA750 available from Rigaku Corporation
Measurement frequency: non-pulse measurement
Anode diameter (analysis region): 4 mm in diameter
Discharge power: 30 W
Ar gas pressure: 2.5 hPa
Elements of interest: Fe, Mn, Si, C, O, Zn, Cr

[Metal Microstructure]

The metal microstructure (the fraction of microstructures at a position of t/4) in the hot-dip galvannealed steel sheets according to Experiment Nos. 1 to 13 was measured as described below.

Each hot-dip galvannealed steel sheet was polished such that the cross-section parallel to the rolling direction appeared at the position of t/4. The cross-section was corroded with Nital liquid to expose the metal microstructure. This cross-section was observed with SEM at a magnification of 1000 times. From the observation result, the area fractions of martensite, bainite, and ferrite in the entire microstructure were calculated by point counting (100 points). Specifically, first, 10 vertical lines at regular intervals and 10 horizontal lines at regular intervals were drawn to form a grid pattern on the captured photograph. Accordingly, 100 intersections of the vertical lines and the horizontal lines were formed. The number of intersections in martensite, bainite, and ferrite were counted out of 100 intersections. The area fraction of martensite was determined by dividing the number of intersections in martensite by the total number of intersections (100). Similarly, the area fraction was determined for bainite and ferrite.

Figure 1:
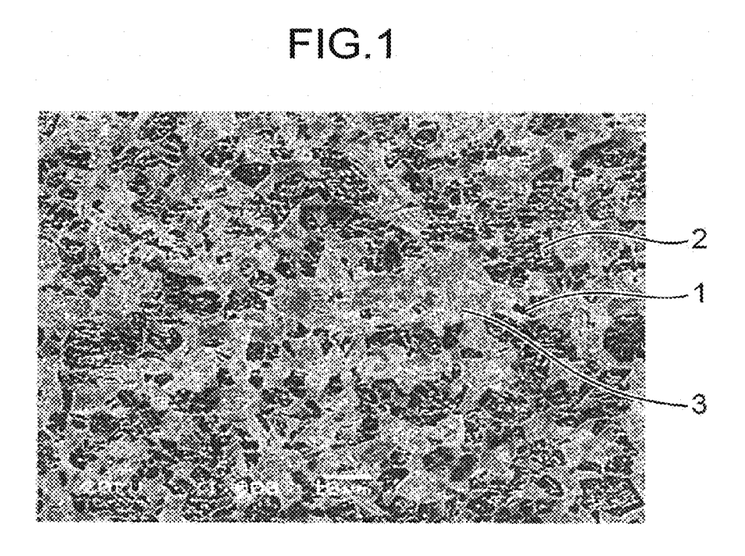
FIG. 1 illustrates an example SEM photograph of the cross-section of a hot-dip galvannealed steel sheet at a position of t/4.

The metal microstructure was identified as described below. FIG. 1 illustrates an example SEM photograph of the cross-section of a hot-dip galvannealed steel sheet at a position of 114. In FIG. 1, regions that appeared black and contained no fine white particles inside as indicated by 1 were determined to be ferrite. In FIG. 1, regions that appeared black and contained fine white particles inside as indicated by 2 were determined to be bainite. In FIG. 1, regions that appeared to be entirely white as indicated by 3 were determined to be martensite.

The tensile strength, yield strength, elongation, platability, and nut peeling load of the hot-dip galvannealed steel sheets according to Experiment Nos. 1 to 13 were measured as described below.

[Tensile Strength, Yield Strength, and Elongation]

The tensile strength TS, yield strength YS, and elongation EL of the hot-dip galvannealed steel sheets according to Experiment Nos. 1 to 13 were measured in the tensile test in accordance with JIS Z 2241:2011. Specifically, test pieces for measuring the tensile strength, the yield strength, and the elongation were cut out from the hot-dip galvannealed steel sheets according to Experiment Nos. 1 to 13. The test pieces were No. 5 test pieces specified in JIS Z 2241:2011. At this time, the test pieces were sampled such that the longitudinal direction of the test pieces was parallel to the direction (coil width direction) perpendicular to the rolling direction. The tensile test (tension rate 10 mm/min, normal temperature) in accordance with JIS Z 2241(2011) was measured by using the test pieces.

[Plating Deposition Weight]

The deposition weight (plating deposition weight) of the hot-dip galvannealed layer in each of the hot-dip galvannealed steel sheets according to Experiment Nos. 1 to 13 was obtained by the dissolution method.

[Platability]

The surface of the hot-dip galvannealed steel sheets according to Experiment Nos. 1 to 13 was visually observed. As a result, the hot-dip galvannealed steel sheets that were determined to have good platability because of absence of bare spots, uneven alloying, and the like were rated "Good", and the hot-dip galvannealed steel sheets that were determined to have poor platability because of presence of bare spots, uneven alloying, and the like were rated "Poor".

[Nut Peeling Load]

To evaluate the nut projection weldability of the hot-dip galvannealed steel sheets according to Experiment Nos. 1 to 13, the "indentation peel test" was performed as the peel test, and the peeling load (nut peeling load) in this test was measured.

Figure 2:
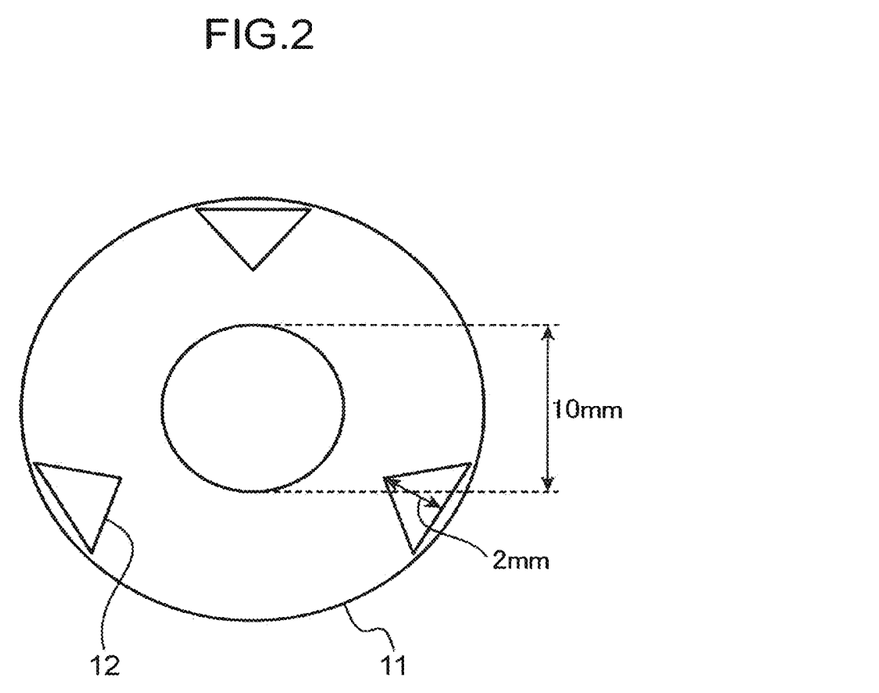
FIG. 2 illustrates a plan view of a projection nut used in a nut peel test.

In the peel test, test pieces 50 mm square sampled from the hot-dip galvannealed steel sheets were used. A throughhole having a diameter of 11 mm was formed at the center of each test piece, and a hexagonal weld (M10) nut (projection nut) having a protrusion (projection) on the bearing surface as illustrated in FIG. 2 was welded to the test piece such that the nut was concentric to the through-hole. The welding conditions were as described below.

Welding machine: DC welding machine
Electrode force: 4000 N
Weld time: 133 ms (8 cycles, 60 Hz)
Current: 9.5 kA A projection nut 11 has one weld protrusion 12 near each center of every other side among six sides of the weld surface as illustrated in FIG. 2. The weld protrusion 12 has a substantially triangular frustum shape. FIG. 2 illustrates a plan view of the projection nut used in the nut peel test.

(Indentation Peel Test)

The indentation peel test was performed with reference to the indentation peel test method in JIS B 1196 Annex A. Specifically, the hot-dip galvannealed steel sheet which was a material to be evaluated was attached to a jig in which a spacer had a hole diameter of 30 mm. A bolt was inserted into the nut welded to the material to be evaluated. The bolt was pushed under the condition of an indentation rate of 5 min/min such that the load and the bolt were made as concentric as possible, and the load (nut peeling load) in peeling the nut from the hot-dip galvannealed steel sheet was measured. A nut peeling load of 3200 N or higher was acceptable.

Table 2 and Table 3 show these results as well as the manufacturing conditions, the average oxygen concentration in the surface area, the fraction of microstructures, the sheet thickness of the hot-dip galvannealed steel sheets, and the plating deposition weight. The average oxygen concentration in the surface area, plating deposition weight, and nut peeling load of the hot-dip galvannealed steel sheet according to Experiment No. 2 were not measured because of poor platability and expressed as "–" in Table 2 and Table 3.

<Experiment Nos. 14 to 16 (Examples Manufactured in Lab Facility Using Steel Types h and i)>

[Hot Rolling]

Each of the manufactured lab materials was soaked at 1250° C. for 30 minutes, hot-rolled to a finishing thickness of 2.3 mm at a finishing temperature of 885° C. to 920° C., and cooled so as to simulate coiling at the coiling temperature shown in Table 2.

[Pickling]

The hot-rolled steel sheets (hot-rolled materials) were pickled by dipping in pickling tanks containing hydrochloric acid with an average concentration of 12 mass %. Specifically, the hot-rolled materials were dipped for 10 minutes in a pickling solution having a liquid temperature (pickling solution temperature) of 80° C.

[Cold Rolling]

The pickled steel sheets were cold-rolled such that the sheet thickness changes from 2.3 mm to 1.4 mm.

[Annealing]

The cold-rolled materials were cut to a size of 1.4 mm in thickness, 150 mm in width, and 70 mm in length. These cut-out cold-rolled materials were annealed by using a lab heating furnace (CAL simulator). In Table 2, the case of using the lab heating furnace is indicated by 3 in the section of the furnace. Specifically, the cold-rolled materials were soaked at the soaking temperatures shown in Table 2 for the soaking times shown in Table 2. Subsequently, the soaked materials were cooled to the cooling finishing temperatures shown in Table 2 at the cooling rates (average cooling rates) shown in Table 2. The cooled materials were then maintained at the cooling finishing temperatures shown in Table 2 for the holding times shown in Table 2.

[Heat Treatment]

Separate from the plating process for providing hot-dip galvannealed steel sheets as described below, the heat treatment with the same heat pattern as that in the plating process was performed without forming a plating layer. The steel sheets thus obtained are referred to as post-heat treatment steel sheets. In other words, the steel sheets are referred to as post-heat treatment steel sheets according to Experiment Nos. 14 to 16.

[Metal Microstructure]

The metal microstructure (the fraction of microstructures at a position of t/4) in the post-heat treatment steel sheets according to Experiment Nos. 14 to 16 was determined as described below.

Each post-heat treatment steel sheet (1.4 mm in thickness, 150 mm in width, and 70 mm in length) was cut to a size of 1.4 mm in thickness, 15 mm in width, and 10 mm in length. The cut-out post-heat treatment steel sheet was polished such that the cross-section parallel to the rolling direction appeared at the position of t/4. The cross-section was corroded with Nital liquid to expose the metal microstructure. This cross-section was observed with SEM at a magnification of 1000 times. From the observation result, the area fractions of martensite, bainite, and ferrite in the entire microstructure were calculated by point counting (100 points). Specifically, first, 10 vertical lines at regular intervals and 10 horizontal lines at regular intervals were drawn to form a grid pattern on the captured photograph. Accordingly, 100 intersections of the vertical lines and the horizontal lines were formed. The number of intersections in martensite, bainite, and ferrite were counted out of 100 intersections. The area fraction of martensite was determined by dividing the number of intersections in martensite by the total number of intersections (100). Similarly, the area fraction was determined for bainite and ferrite.

The metal microstructure was identified as described below. FIG. 1 illustrates an example SEM photograph of the cross-section of the post-heat treatment steel sheet at a position of t/4. In FIG. 1, regions that appeared black and contained no fine white particles inside as indicated by 1 were determined to be ferrite. In FIG. 1, regions that appeared black and contained fine white particles inside as indicated by 2 were determined to be bainite. In FIG. 1, regions that appeared to be entirely white as indicated by 3 were determined to be martensite. Since the post-heat treatment steel sheets have been heated with the same heat pattern as that for the hot-dip galvannealed steel sheets, the post-heat treatment steel sheets are the same as the hot-dip galvannealed steel sheets except for whether the hot-dip galvannealed layer is present. For example, the post-heat treatment steel sheets also have the same metal microstructure as the hot-dip galvannealed steel sheets.

The tensile strength, yield strength, and elongation of the post-heat treatment steel sheets according to Experiment Nos. 14 to 16 were measured by the same methods as the above-described methods for measuring the tensile strength, the yield strength, and the elongation. Since the post-heat treatment steel sheets have been heated with the same heat pattern as that for the hot-dip galvannealed steel sheets (Experiment Nos. 1 to 13: the hot-dip galvannealed steel sheets (actual plated materials) according to Experiment Nos. 1 to 13, Experiment Nos. 14 to 16: the hot-dip galvannealed steel sheets (lab plated materials) according to Experiment Nos. 14 to 16), the post-heat treatment steel sheets are the same as the hot-dip galvannealed steel sheets except for whether the hot-dip galvannealed layer is present. For example, the tensile strength, yield strength, and elongation of the post-heat treatment steel sheets are the same as the tensile strength, yield strength, and elongation of the steel sheets in the hot-dip galvannealed steel sheets.

[Average Oxygen Concentration in Surface Area]

The average oxygen concentration in the surface area of each of the hot-dip galvannealed steel sheets according to Experiment Nos. 14 to 16 was measured by glow discharge optical emission spectrometry (GDOES). By using the test pieces used in the peel test for measuring the nut peeling load described below, the oxygen concentration in a region that was not affected by welding and the peel test was measured.

The concentration profiles of Fe and Zn in the hot-dip galvannealed steel sheets from the surface in the sheet thickness direction were determined, and the positions of the concentration profiles at which the Fe concentration was the same as the Zn concentration were defined as the interface between the hot-dip galvannealed layer and the steel sheet. The profile of the oxygen concentration in the hot-dip galvannealed steel sheets from the surface in the sheet thickness direction was determined, and the average value of the oxygen concentration in a region (surface area) of 1 μm from the interface to a position of 1 μm toward the inside in the sheet thickness direction was calculated. This average value is the average oxygen concentration in the surface area.

The GDOES measurement conditions were as described below.

Apparatus: Marcus-type high-frequency glow discharge optical emission spectroscopy (rf-GD-OES) (GD-Profiler2 available from HORIBA, Ltd.)
Measurement frequency: non-pulse measurement
Anode diameter (analysis region): 4 mm in diameter
Discharge power: 35 W
Ar gas pressure: 6.0 hPa
Elements of interest; Fe, Mn, Si, C, O, Zn, Cr

[Plating Process]

A hot-dip galvannealed layer was formed on each of the annealed steel sheets (annealed materials) such that the plating deposition weight was 50 g/m² per surface. Specifically, the annealed steel sheets (annealed materials) were subjected to the plating process by maintaining the annealed steel sheets at the cooling finishing temperatures (e.g., 460° C. in Experiment No. 1), then dipping the steel sheets in a galvanizing bath with an Al concentration of 0.13 mass % and a bath temperature of 460° C. for 4 seconds, pulling the steel sheets out of the galvanizing bath at a pulling rate of 100 mm/s, and wiping the steel sheets at 200 L/min. The plated steel sheets were subjected to the alloying process by maintaining the plated steel sheets at a sheet temperature of 500° C. for 18 seconds. The hot-dip galvannealed steel sheets according to Experiment Nos. 14 to 16 were thus obtained as plated steel sheets.

[Plating Deposition Weight]

The deposition weight (plating deposition weight) of the hot-dip galvannealed layer of the hot-dip galvannealed steel sheets according to Experiment Nos. 14 to 16 was measured by the same method as the above-described method for measuring the plating deposition weight.

[Platability and Nut Peeling Load]

The platability and nut peeling load of the hot-dip galvannealed steel sheets according to Experiment Nos. 14 to 16 were measured by the same methods as the above-described methods for measuring the platability and the nut peeling load.

Table 3 shows these results as well as the fraction of microstructures, the tensile strength, the yield strength, the elongation, and the sheet thickness of the hot-dip galvannealed steel sheets. The nut peeling load of the hot-dip galvannealed steel sheet according to Experiment No. 2 was not measured because of poor platability and expressed as "–" in Table 3.

Table 2 and Table 3 show these results as well as the manufacturing conditions, the average oxygen concentration in the surface area, the fraction of microstructures, the sheet thickness of the hot-dip galvannealed steel sheets, and the plating deposition weight.

TABLE 2

| Experiment No. | Steel Type | Coiling Temperature (° C.) | Furnace | Annealing Soaking Temperature (° C.) | Dew Point (° C.) | Soaking Time (sec) | Cooling Rate (° C./s) | Cooling Finishing Temperature (° C.) | Holding Time (sec) | Average Oxygen Concentration (mass %) in Surface Area | Plating Deposition Weight (g/m²) |
|---|---|---|---|---|---|---|---|---|---|---|---|
| 1 | a | 660 | 1 | 830 | −45 | 60 | 5.3 | 460 | 50 | 0.04 | 58 |
| 2 | a | 620 | 1 | 820 | −45 | 60 | 5.1 | 445 | 50 | — | — |
| 3 | a | 660 | 1 | 830 | 0 | 60 | 5.3 | 460 | 50 | 0.49 | 45 |
| 4 | b | 680 | 1 | 850 | −45 | 55 | 5.7 | 460 | 48 | 0 | 49 |
| 5 | b | 680 | 1 | 850 | −19 | 55 | 5.7 | 460 | 48 | 0.15 | 54 |
| 6 | c | 570 | 2 | 830 | −45 | 45 | 11.2 | 460 | 30 | 0.67 | 45 |
| 7 | c | 570 | 1 | 870 | −1 | 90 | 3.2 | 480 | 30 | 0.92 | 58 |
| 8 | d | 660 | 2 | 925 | −45 | 45 | 12.9 | 500 | 30 | 0.43 | 59 |
| 9 | e | 660 | 2 | 890 | −45 | 45 | 11.2 | 500 | 30 | 1.43 | 57 |
| 10 | f | 660 | 1 | 820 | −17 | 60 | 5.6 | 470 | 50 | 0.48 | 55 |
| 11 | a | 660 | 1 | 830 | −45 | 60 | 5.3 | 460 | 50 | 0.08 | 58 |
| 12 | d | 660 | 2 | 925 | −45 | 45 | 12.9 | 500 | 30 | 0.33 | 59 |
| 13 | g | 660 | 1 | 830 | −45 | 60 | 5.2 | 460 | 50 | 0.08 | 56 |
| 14 | h | 680 | 3 | 880 | −45 | 110 | 6.3 | 460 | 48 | 0.11 | 46 |
| 15 | h | 680 | 3 | 880 | −20 | 110 | 6.3 | 460 | 48 | 0.13 | 63 |
| 16 | i | 680 | 3 | 880 | −45 | 110 | 6.3 | 460 | 48 | 0.45 | 54 |

TABLE 3

| Experiment No. | Fraction (area %) of Microstructures at Position of t/4 | | | Tensile Strength TS (MPa) | Yield Strength YS (MPa) | Elongation EL (%) | Sheet Thickness t (mm) | Platability | Nut Peeling Load (N) |
|---|---|---|---|---|---|---|---|---|---|
| | Martensite M | Bainite B | Ferrite F | | | | | | |
| 1 | 61 | 38 | 1 | 1207 | 889 | 9.3 | 1.2 | Good | 5521 |
| 2 | 55 | 44 | 1 | 1192 | 860 | 8.0 | 1.4 | Poor | — |
| 3 | 60 | 39 | 1 | 1201 | 839 | 8.6 | 1.2 | Good | 1905 |
| 4 | 50 | 0 | 50 | 1040 | 610 | 13.1 | 1.2 | Good | 3182 |
| 5 | 54 | 0 | 46 | 1038 | 636 | 13.0 | 1.2 | Good | 1889 |
| 6 | 48 | 0 | 52 | 1032 | 666 | 14.2 | 1.4 | Poor | 1885 |
| 7 | 46 | 0 | 54 | 822 | 540 | 14.1 | 1.4. | Poor | 1519 |
| 8 | 73 | 27 | 0 | 1254 | 872 | 8.8 | 1.4 | Good | 945 |
| 9 | 12 | 88 | 0 | 1002 | 695 | 14.2 | 1.4 | Good | 1324 |
| 10 | 44 | 32 | 24 | 1183 | 654 | 13.6 | 1.4 | Good | 1629 |
| 11 | 65 | 35 | 0 | 1226 | 830 | 10.0 | 1.4 | Good | 4231 |
| 12 | 70 | 30 | 0 | 1256 | 893 | 8.8 | 1.4 | Good | 1789 |
| 13 | 63 | 37 | 0 | 1220 | 878 | 8.5 | 1.4 | Good | 4273 |
| 14 | 84 | 15 | 1 | 1242 | 840 | 8.5 | 1.4 | Good | 2679 |
| 15 | 84 | 15 | 1 | 1242 | 840 | 8.5 | 1.4 | Good | 1333 |
| 16 | 71 | 28 | 1 | 1263 | 874 | 9.0 | 1.4 | Good | 2937 |

Table 2 and Table 3 indicate that, when the hot-dip galvannealed steel sheets (Experiment Nos. 1, 11, and 13) were manufactured by the above-described manufacturing method using the steel satisfying the above-described composition, the hot-dip galvannealed steel sheets have an average oxygen concentration of 0.10 mass % or less in the surface area, and the metal microstructure at the position of t/4 includes 50 to 85 area % of martensite, 15 to 50 area % of bainite, and 5 area % or less of ferrite. The hot-dip galvannealed steel sheets according to Experiment Nos. 1, 11, and 13 have high strength as high as a tensile strength of 1100 to 1300 MPa and a yield strength of 800 MPa or higher and further have an elongation of 8.0% or more. In addition to platability, the hot-dip galvannealed steel sheets according to Experiment Nos. 1, 11, and 13 exhibit a nut peeling load as high as 3200 N or higher and thus have good nut projection weldability.

If the coiling temperature in hot rolling was low (Experiment Nos. 2, 6, and 7), it was impossible to form a suitable hot-dip galvannealed layer.

In the case of annealing under the condition of high dew point (Experiment Nos. 3, 5, 7, 10, and 15), the average oxygen concentration in the surface area was high, and the nut peeling load was low. This may indicate, at high dew point, the amount of the Si-based oxide present at the weld interface increases to degrade nut projection weldability.

In the case of annealing under the condition of high soaking temperature (Experiment Nos. 8, 9, 12, 14 to 16), the average oxygen concentration in the surface area was high, and the nut peeling load was low. This may indicate, at high soaking temperature, the amount of the Si-based oxide present at the weld interface increases to degrade nut projection weldability.

In the case of low B content in the composition (Experiment Nos. 4 to 7), the tensile strength was lower than 1100 MPa, and the yield strength was lower than 800 MPa. This may be because the fraction of at least one of bainite and martensite is low, and the fraction of ferrite is high.

In the case of high Si content in the composition (Experiment Nos. 6 to 10, 12, and 16), the average oxygen concentration in the surface area was high, and the nut peeling load was low. This may indicate, at high Si content, the amount of the Si-based oxide present at the weld interface to ensure platability increases to degrade nut projection weldability. In the case of high Si content in the composition and low coiling temperature in hot rolling (Experiment No. 6), platability was insufficient even using a NOF-type annealing furnace.

This application is based on Japanese Patent Application No. 2018-062586 filed Mar. 28, 2018 and Japanese Patent Application No. 2019-027330 filed Feb. 19, 2019, the entire contents of which are incorporated herein by reference.

To express the present invention, the present invention is appropriately and sufficiently described above by way of the embodiments. However, it should be recognized that those skilled in the art can easily modify and/or improve the embodiments. Therefore, it is to be understood that the modifications or improvements carried out by those skilled in the art fall within the scope of the claims unless the modifications or improvements depart from the scope of the claims recited in the appended claims.

INDUSTRIAL APPLICABILITY

According to the present invention, a hot-dip galvannealed steel sheet having good nut projection weldability and good platability is provided. According to the present invention, a method for manufacturing a hot-dip galvannealed steel sheet having good nut projection weldability and good platability is provided.

The invention claimed is:
1. A hot-dip galvannealed steel sheet comprising:
a steel sheet; and
a hot-dip galvannealed layer on a surface of the steel sheet,
wherein the steel sheet comprises, in mass %,
C: 0.10% or more and 0.25% or less,
Si: more than 0% and 0.50% or less,
Mn: more than 2.0% and 3.5% or less,
P: more than 0% and 0.1% or less,
S: more than 0% and 0.05% or less,
Al: 0.01% or more and 0.10% or less,
Ti: more than 0% and 0.1% or less,
B: 0.0020% or more and 0.0050% or less,
N: more than 0% and 0.01% or less,
Cr: more than 0% and 0.5% or less, and
Mo: more than 0% and 0.5% or less,
wherein the steel sheet has an average oxygen concentration of 0.10 mass % or less in a region of 1 μm from an interface between the steel sheet and the hot-dip galvannealed layer toward the steel sheet, wherein the interface is a face where a mass concentration of Fe is the same as a mass concentration of Zn, and wherein a metal microstructure of the steel sheet at a position of t/4, where t represents a sheet thickness of the hot-dip galvannealed steel sheet, comprises 50 to 85 area % of martensite, 15 to 50 area % of bainite, and 5 area % or less of ferrite.

2. A method for manufacturing the hot-dip galvannealed steel sheet of claim 1, the method comprising:

soaking a steel having a composition of the steel sheet at 1100° C. to 1300° C., hot-rolling the steel at a finishing temperature of 850° C. to 950° C., and coiling the hot-rolled steel at 630° C. to 680° C., to provide a hot-rolled material;

pickling the hot-rolled material using 3 to 20 mass % hydrochloric acid under a condition of 60° C. to 90° C. for 35 to 200 seconds;

cold-rolling the hot-rolled material after pickling, to provide a cold-rolled material;

annealing the cold-rolled material by soaking the cold-rolled material at an $Ac_3$ point or higher and lower than 880° C. under a condition of a dew point of −25° C. or lower, to provide a soaked material;

cooling the soaked material to a cooling finishing temperature of 380° C. to 500° C. at 3.0° C./s or more, to provide a cooled material;

maintaining the cooled material at the cooling finishing temperature for 15 seconds or longer, to provide the steel sheet; and subjecting the steel sheet to a plating process, to form the hot-dip galvannealed layer on the steel sheet.

* * * * *